United States Patent
Subbiah

(10) Patent No.: US 6,725,038 B1
(45) Date of Patent: Apr. 20, 2004

(54) METHOD AND APPARATUS FOR SPEEDING UP AAL2 CONNECTION SETUP DURING HANDOVER IN ADVANCED CELLULAR NETWORKS

(75) Inventor: Baranitharan Subbiah, Chelmsford, MA (US)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/237,728

(22) Filed: Jan. 26, 1999

(51) Int. Cl.[7] ............................................. H04Q 7/20
(52) U.S. Cl. ...................... 455/436; 455/439; 370/331; 370/382
(58) Field of Search ................... 370/331, 332, 370/522, 333; 455/436, 403, 422, 439, 437, 438, 492

(56) References Cited

U.S. PATENT DOCUMENTS

| | | | | |
|---|---|---|---|---|
| 5,499,387 A | * | 3/1996 | Chambert | 455/436 |
| 5,912,885 A | * | 6/1999 | Mitts et al. | 370/331 |
| 6,009,326 A | * | 12/1999 | Roder et al. | 455/436 |
| 6,125,276 A | * | 9/2000 | Lupien | 455/436 |
| 6,131,030 A | * | 10/2000 | Schon et al. | 455/438 |
| 6,246,878 B1 | * | 6/2001 | Wallentin | 455/442 |
| 6,298,060 B1 | * | 10/2001 | Miyakawa et al. | 370/470 |
| 6,396,820 B1 | * | 5/2002 | Dolan et al. | 370/328 |
| 6,449,290 B1 | * | 9/2002 | Willars et al. | 370/507 |

FOREIGN PATENT DOCUMENTS

EP     0 479 255     4/1992

OTHER PUBLICATIONS

B. G. Marchent et al., *Handover and Macro Diversity for 3rd Generation Mobile Systems Within ATM Fixed Networks*, IEEE Vehicular Technology Conference, US New York, IEEE, vol. Conf. 47, 1997 pp. 1151–1155.

"B–ISND ATM Adaptation layer specification: Type 2 AAL", *International Telecommunication Union*, ITU–T, 1.363.2, 49 pages (Sep. 1997).

Subbiah, B. et al., "ATM Adaptation Layer 2 (AAL2) for Low Bit Rate Speech and Data: Issues and Challenges", *1998 IEEE ATM Workshop Proceedings*, George Mason University, Fairfax, VA, pp. 225–233 (May 26–29, 1998).

* cited by examiner

*Primary Examiner*—Congvan Tran
(74) *Attorney, Agent, or Firm*—Squire, Sanders & Dempsey L.L.P.

(57) ABSTRACT

A method and apparatus for speeding up AAL2 connection setup during handover in advanced cellular networks. Connection parameters for the current AAL2 connection are bundled and transferred in a single message to be used setting up a new AAL2 connection in the coverage area. The method includes requesting a new AAL2 connection from a destination access network to a remote AAL2 peer by a serving access network, initiating an AAL2 connection setup by the destination access network upon receiving a handover request from a serving access network, bundling AAL2 connection parameters associated with an old AAL2 connection by the serving access network, transferring the bundled AAL2 connection parameters to the destination access network and establishing a new AAL2 connection to the remote AAL2 peer connection by the destination access network using the transferred AAL2 connection parameters. The transferring comprises encapsulating the AAL2 connection parameters within Radio Network System Application Part signaling. The serving access network may be a Base Station or a radio network controller. The destination access network may be a Base Station or a radio network controller.

18 Claims, 7 Drawing Sheets

METHOD AND APPARATUS FOR SPEEDING UP AAL2 CONNECTION SETUP DURING HANDOVER IN ADVANCED CELLULAR NETWORKS

BACKGROUND OF THE INVENTION

1. Field of the Invention

This invention relates in general to a wireless communication systems, and more particularly to a method and apparatus for speeding up AAL2 connection setup during handover in advanced cellular networks.

2. Description of Related Art

The demand by consumers all over the world for mobile communications continues to expand at a rapid pace and will continue to do so for at least the next decade. Over 100 million people were using a mobile service by the end of 1995, and that number is expected to grow to 300 million by the year 2000. Several factors are contributing to the exciting growth in the telecommunications industry. For example, a combination of technology and competition bring more value to consumers. Phones are smaller, lighter, had a longer battery life, and are affordable now for the mass market. Operators are providing excellent voice quality, innovative services, and roaming across the country or world. Most important, mobility is becoming less expensive for people to use. Around the world, as well as in the United States, governments are licensing additional spectrum for new operators to compete with traditional cellular operators. Competition brings innovation, new services, and lower prices for consumers.

The basis for any air interface design is how the common transmission medium is shared between users, that is, the multiple access scheme. In frequency division multiple access (FDMA), the total system bandwidth is divided into frequency channels that are allocated to the users. In time division multiple access (TDMA), each frequency channel is divided into time slots and each user is allocated a time slot. In CDMA, multiple access is achieved by assigning each user a pseudo-random code (also called pseudo-noise codes due to noise-like auto-correlation properties) with good auto- and cross-correlation properties. This code is used to transform a user's signal into a wideband spread spectrum signal. A receiver then transforms this wideband signal into the original signal bandwidth using the same pseudo-random code. The wideband signals of other users remain wideband signals. Possible narrowband interference is also suppressed in this process. TDMA and CDMA usually use FDMA to divide the frequency bank into smaller frequency-channels, which are then divided in a time or code division fashion.

There are several ways to classify CDMA schemes. The most common classification scheme is based on the modulation method used to obtain the wideband signal. This division leads to three types of CDMA: direct sequence (DS), frequency hopping (FH), and time hopping (TH). In DS-CDMA, spectrum is spread by multiplying the information signal with a pseudo-noise sequence, resulting in a wideband signal. In the frequency hopping spread spectrum, a pseudo-noise sequence defines the instantaneous transmission frequency. The bandwidth at each moment is small, but the total bandwidth over, for example, a symbol period is large. Frequency hopping can either be fast (several hops over one symbol) or slow (several symbols transmitted during one hop). In the time hopping spread spectrum, a pseudo-noise sequence defines the transmission moment. Furthermore, combinations of these techniques are possible.

Nevertheless, DS-CDMA is the technique that is being used for third generation wideband CDMA (WCDMA) proposals. Recently, extensive investigations have been carried out into the application of a code division multiple access (CDMA) system as an air interface multiple access scheme for IMT-2000/UMTS (International Mobile Telecommunications System 2000/Universal Mobile Telecommunications System). It appears that CDMA is the strongest candidate for the third generation wireless personal communication systems. As a result, many research and development (R&D) projects in the field of wideband CDMA have been going on in Europe, Japan, the United States, and Korea.

Wideband CDMA has a bandwidth of 5 MHz or more. The nominal bandwidth for all third generation proposals is 5 MHz. There are several reasons for choosing this bandwidth. First, data-rates of 144 and 384 Kbps, the main targets of third generation systems, are achievable within 5 MHz bandwidth with a reasonable capacity. Even a 2-Mbps peak rate can be provided under limited conditions. Second, lack of spectrum calls for reasonably small minimum spectrum allocation, especially if the system has to be deployed within the existing frequency bands occupied already by second generation systems. Third, the 5-MHz bandwidth can resolve (separate) more multipaths than narrower bandwidths, increasing diversity and thus improving performance. Larger bandwidths of 10, 15, and 20 MHz have been proposed to support higher data rates more effectively.

Several wideband CDMA proposals have been made for third generation wireless systems. These have all been proposed to provide advanced properties such as provision of multirate services, packet data, complex spreading, a coherent uplink using a user dedicated pilot, additional pilot channel in the downlink for beam-forming, seamless inter-frequency handover, fast power control in the downlink, and optional multi-user detection.

Today's transmission protocols of many telecommunication networks are based on pulse code modulation (PCM), and mobile radio systems are no exception. The switching is also based on the switching of 64- or 56-Kbps PCM connections. ATM technology has received lot of attention during recent years as the next major transport technology. ATM has also been proposed for wireless applications (i.e., ATM cells are transmitted over the air interface).

ATM provides not only the multiplexing gains of packet switching, but also the guaranteed delay characteristics of circuit switching. The fundamental strategy behind ATM is to split the information into small fixed size units that are easy to handle. The fixed size of the cell allows efficient switching. ATM networks are high-speed switching systems offering large bit pipes, which allow statistical multiplexing (i.e., multiplexing of many connections with variable rate characteristics), which altogether reduces the overall bandwidth requirements. Since ATM is based on the transmission of fixed size cells, it can be easily evolved for future services.

The basic unit in an ATM is a cell of 53 bytes. The ATM cell consists of a header (5 bytes) and information fields (48 bytes). The header consists of a field for Generic flow control (GFC), Virtual path identified (VPI) and Virtual channel identifier (VCI). The VPI and VCI are used to identify the virtual path and virtual channels identified with that path to route the ATM cells from the source node to the destination node.

The ATM and the ATM adaptation layer (AAL) form the data link layer. AAL converts the arbitrarily formatted information supplied by the user into ATM cells. Various forms of AAL protocols are necessary to handle the different types of traffic. AAL0 provides direct access to the ATM layer. AAL1 assumes constant bit rate traffic, which is intolerant of mis-sequenced information and variation in delay. It offers the following function: segmentation and reassembly (SAR) handling of delay variation handling, handling of lost and mis-inserted cells, source clock recovery, monitoring for bit errors, and handling those errors.

AAL2 is used, for example, for voice and video. It assumes that traffic is bursty and intolerant of mis-sequencing and that a time stamp is needed for packet reassembling. It offers the following functions: multiplexing, SAR, handling delay variation, handling cell lost/error, and source clock recovery. AAL2 will be used for compressed speech in third generation mobile radio systems in the network infrastructure.

AAL3/4 and AAL5 are geared to traffic that has bursty characteristics with variable frame length. Furthermore, delay is not critical and packets can be resequenced based on sequence numbers. AAL5 is expected to supersede AAL3/4 since it has lower overhead and TCP/IP acknowledgments fit into one cell in AAL5 instead of two cells as in AAL3/4.

To meet the phenomenal growth in cellular communication and increasing demand for mobile multimedia services, cellular network providers are forging ahead to develop the third generation (3G) cellular network. Not so surprisingly in view of the characteristics described above, ATM is being considered as strong candidate for the Radio Access Network (RAN). ATM is a strong candidate for the RAN because it supports heterogeneous traffic types, provides Quality of Services (QoS) guarantee and is widely deployed in the carrier backbone networks. In order to meet the requirements specific to mobile communications such as transporting low bit rate compressed speech efficiently and within acceptable delay bounds, ITU-T has recently approved AAL2 to cater the needs of emerging multimedia cellular networks.

The use of ATM in 3G cellular access network has been further enhanced by the AAL2 signaling activities at the ITU-T. Mobility provides a seamless connectivity for a user and at the same time creates a number of problems for networks to maintain the connectivity. There have been many solutions available to tackle the problem and demonstrated for long time in GSM networks. However, this issue has been receiving considerable attention lately due to the QoS guarantee with mobility.

In 3G cellular access network, mobile telephony is carried over AAL2 to improve the resource utilization. To setup an AAL2 connection, the new AAL2 signaling protocol will be used. A connection request from a mobile terminal received at a Base Station (BS) initiates a AAL2 connection setup to the remote AAL2 peer entity located either in RAN or Core Network (CN). AAL2 connection setup involves negotiation of number of parameters such as traffic and QoS, codec selection, and maximum size of AAL2 packet. When a mobile user leave the Serving RNC (S-RNC) and enters a Drift RNC (D-RNC), the existing connection at the S-RNC has to be released and a new connection has to be established at the D-RNC. Setting up new AAL2 connection involves re-characterization of connection specific parameters and re-negotiation with the remote peer entity. This process will increase the handover delay and cause problem to the soft handover feature available in WCDMA based 3G networks.

AAL2 connections are originated from the BS (or S-RNC) instead of a mobile terminal in the 3G RAN. This separation of mobile call control and AAL2 connection control within the RAN adds complexity during the handover. Mobile terminals do not have any information related to the AAL2 connection within the RAN and cannot pass them to the new BS or D-RNC. The lack of information about the existing AAL2 connection at the D-RNC during handover will force the D-RNC to start the AAL2 connection setup all over again. This process will lead to re-negotiation of connection specific parameters with the peer entity and increase in delay during handover.

It can be seen that there is a need for a method and apparatus for decreasing overall handover delay when a user is moving from one coverage area to another coverage area in an ATM based advanced cellular radio access network.

It can also be seen that there is a need for a method and apparatus for speeding up AAL2 connection setup during handover in advanced cellular networks

SUMMARY OF THE INVENTION

To overcome the limitations in the prior art described above, and to overcome other limitations that will become apparent upon reading and understanding the present specification, the present invention discloses a method and apparatus for speeding up AAL2 connection setup during handover in advanced cellular networks.

The present invention solves the above-described problems by bundling connection parameters for the current AAL2 connection and transferring in a single message for used in the new coverage area for a new AAL2 connection.

A method in accordance with the principles of the present invention includes requesting a new AAL2 connection from a destination access network to a remote AAL2 peer by a mobile terminal, initiating an AAL2 connection setup by the destination access network by sending a handover request to a serving access network, bundling AAL2 connection parameters associated with an old AAL2 connection by the serving access network, transferring the bundled AAL2 connection parameters to the destination access network and establishing a new AAL2 connection to the remote AAL2 peer connection by the destination access network using the transferred AAL2 connection parameters.

Other embodiments of a method in accordance with the principles of the invention may include alternative or optional additional aspects. One such aspect of the present invention is that the bundled AAL2 connection parameters is selected from the group comprising peak packet rate, burst tolerance, quality-of-service, codec selection, and maximum AAL2 packet size.

Another aspect of the present invention is that the transferring comprises encapsulating the AAL2 connection parameters within signaling messages used between the serving access network and the destination access network.

Another aspect of the present invention is that the method further includes clearing the old AAL2 connection.

Another aspect of the present invention is that the method further includes sending a connection success signal from the destination access network to the serving access network, clearing the old AAL2 connection, and sending a confirm signal from the serving access network to the destination access network.

Another aspect of the present invention is that the serving access network is a Base Station.

Another aspect of the present invention is that the destination access network is a Base Station.

Another aspect of the present invention is that the serving access network is a radio network controller.

Another aspect of the present invention is that the destination access network is a radio network controller.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus which decreases the delay in setting up a AAL2 connection during handover by exchanging AAL2 connection specific information between the handover entities. During a mobile handover, an AAL2 connection from the current Base Station (BS) need to be cleared and a new connection has to be established from the new BS. In order to reduce the handover delay, the Serving RNC (S-RNC) transfers the AAL2 connection information which is being handed over to the Drift RNC (D-RNC). The AAL2 connection specific information such as data rate, codec selection, and traffic and QoS parameters are bundled up and transferred from the S-RNC to the D-RNC at the start of the handover process. Since the new AAL2 connection is established using the same parameters, the new BS need not to characterize and renegotiate the connection parameters for the new AAL2 connection. Due to this method, the delay involved in setting up the new AAL2 connection is reduced during handover thus facilitating a soft handover.

Figure 1:
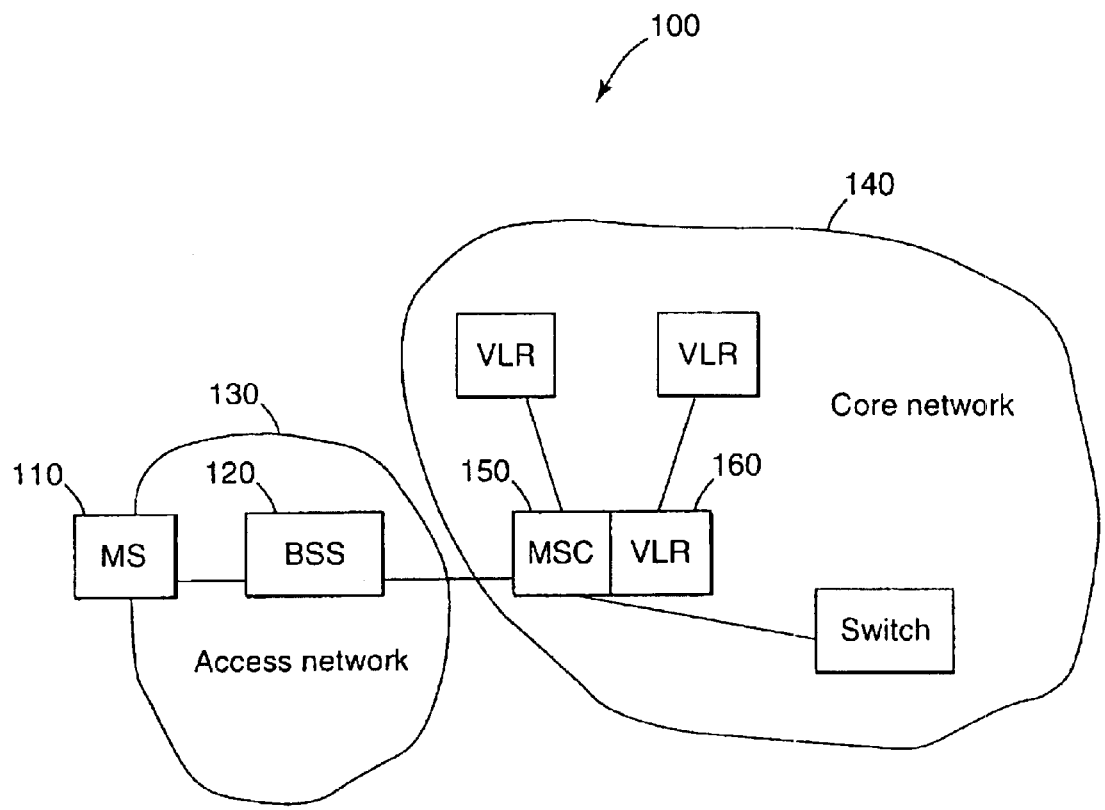
FIG. 1 illustrates the functional network architecture of a cellular system with GSM entities used as an example.

FIG. 1 illustrates the functional network architecture of a cellular system 100 with GSM entities used as an example. In FIG. 1, the mobile station (MS) 110 receives and makes calls through a Base Station subsystem (BSS) 120. The access network 130 includes all functions that enable a user to access services. Furthermore, an access network 130 can be used to hide all access-specific peculiarities from the core network 140. For example, all air interface-related functions are kept within the access network part 130 in a radio access network.

The core network 140 includes the switching network 150 and service network 160. A switching network 150 includes all the functions related to call and bearer control for fixed transmission. The mobile switching center (MSC) 150 in GSM is an example of a switching network entity. A service network 160 includes all functionality for the support services including location management.

Figure 2:
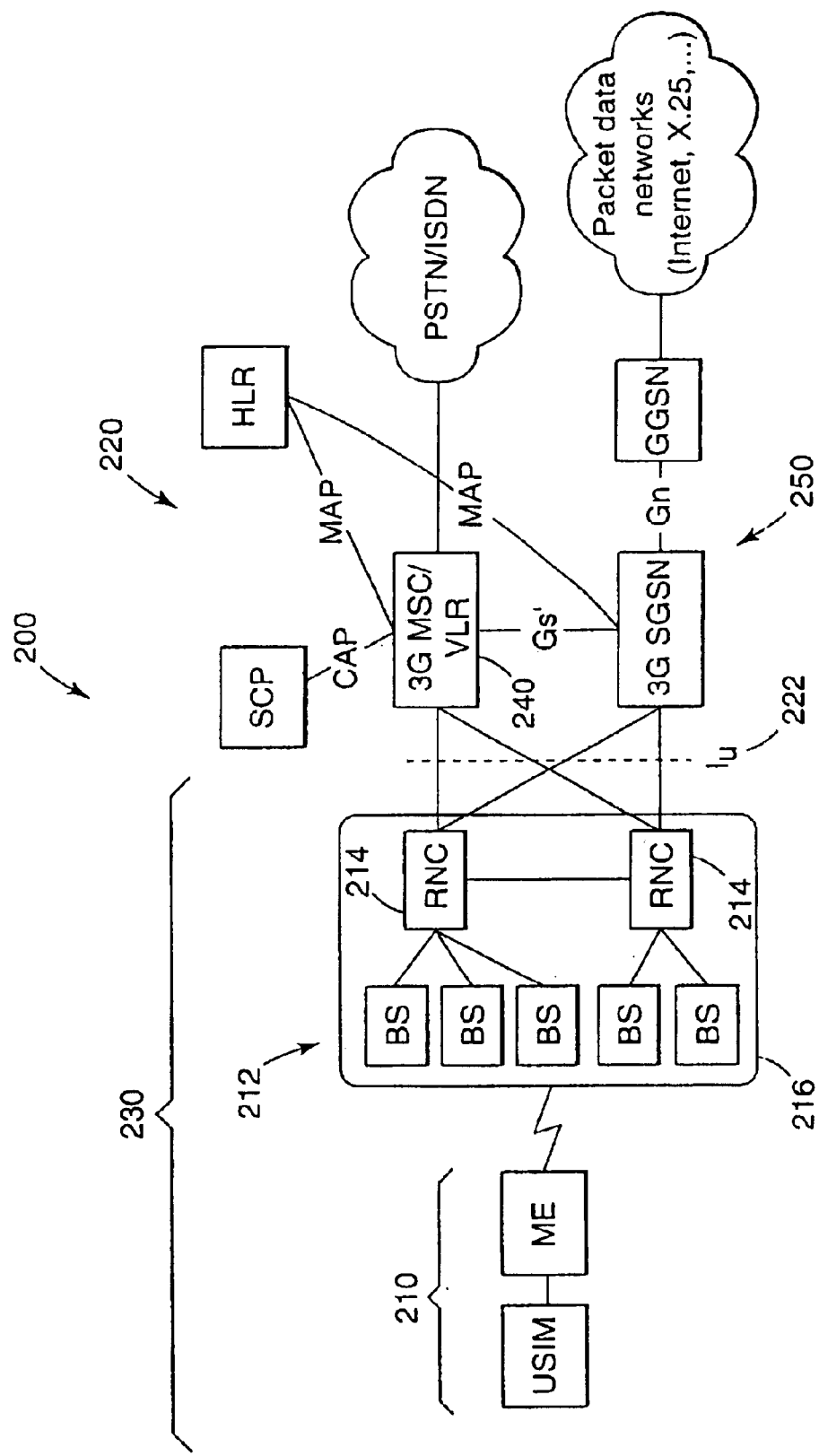
FIG. 2 illustrates one possible embodiment of an advanced communication network.

FIG. 2 illustrates one possible embodiment of an advanced communication network 200, e.g., a third generation GSM evolution. As shown in FIG. 2, the first implementations of Generic Radio Access-Network (GRAN) may be based on the integration of RAN and SGM/UMTS core network, which has been evolved from the GSM core network by integrating new third generation capabilities. The evolved GSM network elements are referred to as 3G MSC and 3G SGSN.

A mobile unit 210 receives and sends signals to a Base Station (BS) 212. Base Stations 212 are in turn coupled to a radio network controller (RNC) 214 in the radio access network (RAN) 216. The RAN interfaces with GSM/UMTS core network 220 via the Iu-interface 222, which corresponds to the GSM A-interface and GPRS Gb-interface. As can be seen, radio access 230 is isolated from the core network 220, and the goal is that the GSM/UMTS core network would have the flexibility to support any radio access scheme. Circuit switched services are routed via the GSM MSC 240, and the packet switched services via the GPRS part 250 of the GSM/UMTS core network.

Figure 3:
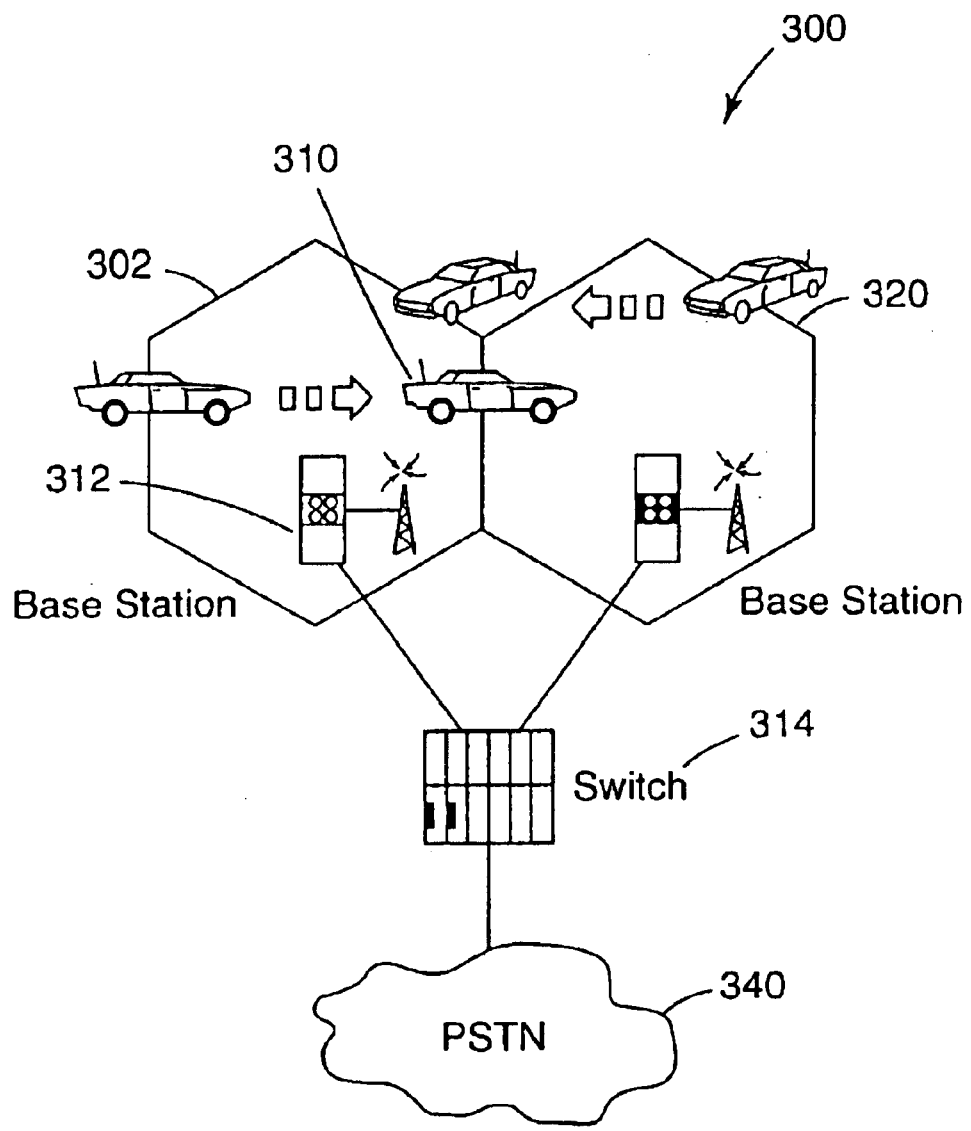
FIG. 3 illustrates this handoff process.

FIG. 3 illustrates the handoff process. As a vehicle 310 moved away from Base Station 312, its signal strength decreases. The Base Station 312 monitored the signal strength during the duration of the call. When signal strength fell below a predetermined threshold level the network 314 asked all predetermined candidates neighboring cells 320 to report the signal strength of the mobile in the vehicle 310. If the signal strength in the neighboring cell 320 was stronger by a predetermined amount, then the network 314 attempted to handoff the call to the candidate neighboring cell 320. Today the cellular system refers to these three basic elements as a mobile station 310, cell sites 302, 320 and mobile switching centers. These three elements are integrated to form a ubiquitous coverage radio system that can connect to the public switched telephone network 340.

Figure 4:
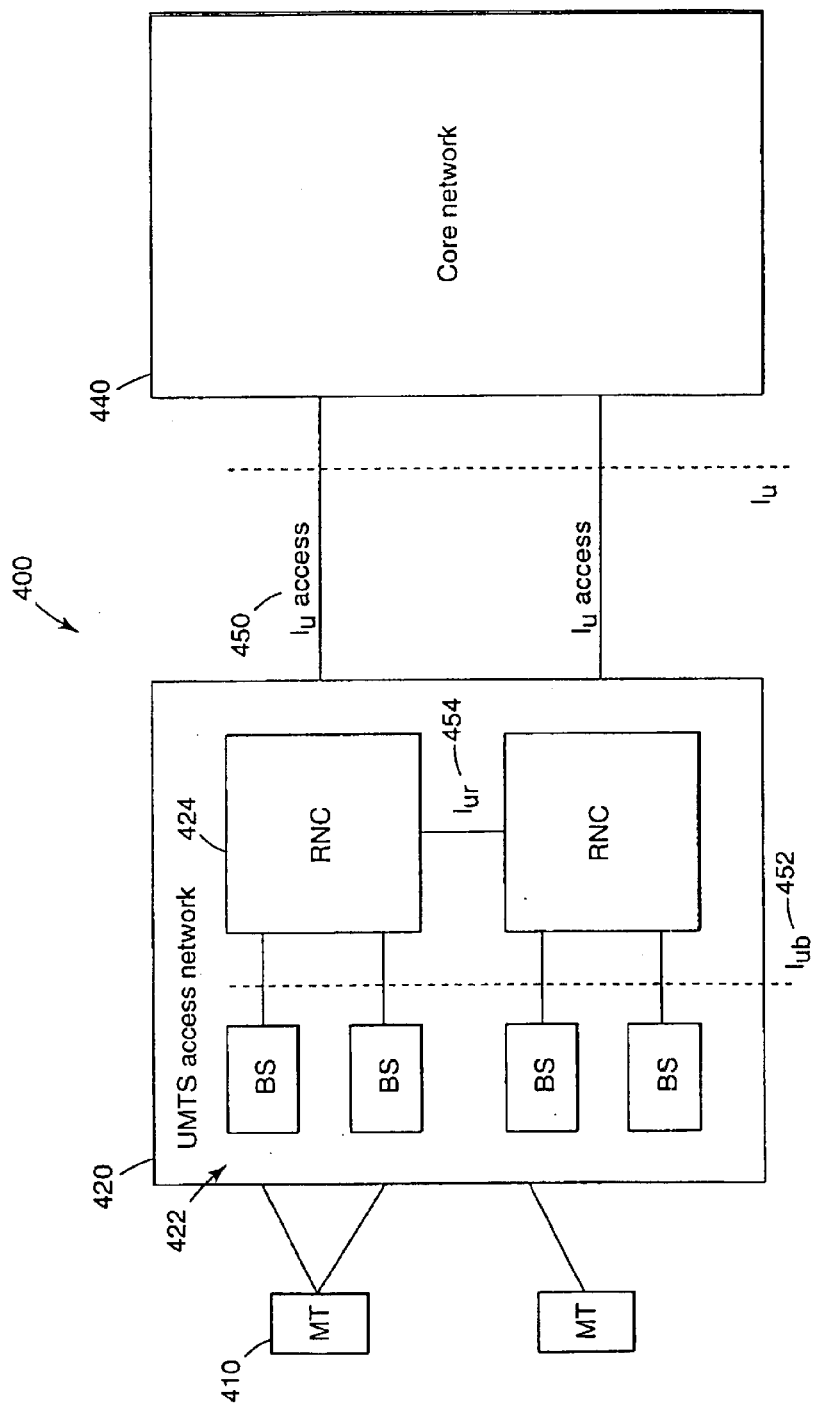
FIG. 4 illustrates the use of ATM in the UMTS access networks.

FIG. 4 illustrates the use of ATM in the UMTS access networks 400. In FIG. 4, mobile terminals communicate via the UMTS access network 420 via Base Stations (BS) 422. The BSs 422 are coupled to the RANs 424. The core network 440 is then coupled to the UMTS access network 420. The use of ATM in 3G cellular access network 420 has been enhanced by the AAL2 signaling activities at the ITU-T. AAL2 signaling is used to setup a AAL2 connection on an pre-established ATM connection. The interface links such as Iu 450, Iub 452 and Iur 454 in the UMTS access network 420 will be implemented using ATM (AAL2). Upon receiving a connection request from a mobile user 410, a BS 422 initiates the AAL2 connection setup by deriving the necessary traffic and QoS, and other connection specific parameters to the AAL2 termination point within the access network gateway. Once a connection is established, speech packets from the mobile user 410 are transferred using AAL2 within the access network 420.

Figure 5:
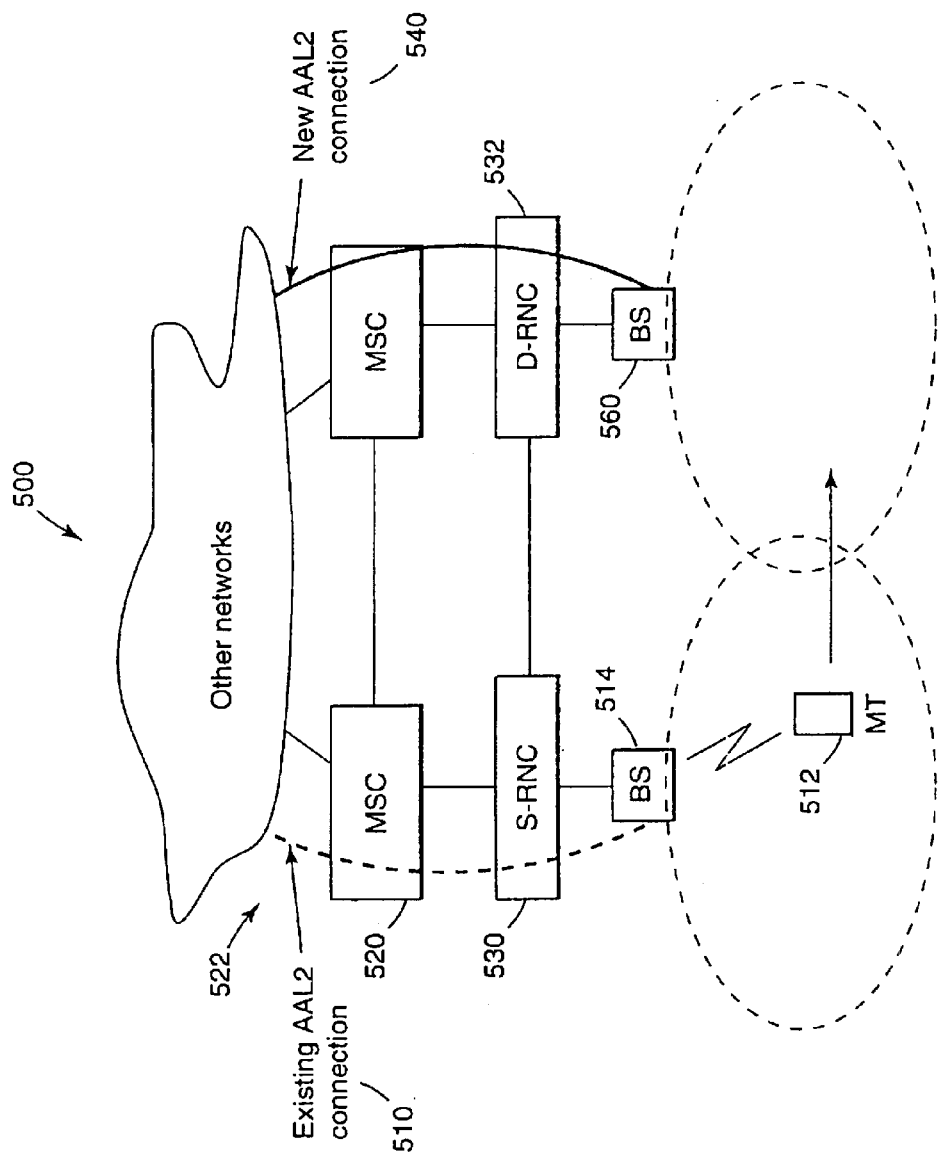
FIG. 5 illustrates the process involved in releasing and setting up AAL2 connection during handover.

FIG. 5 illustrates the process 500 involved in releasing and setting up AAL2 connection during handover. In advanced cellular access network, mobile telephony is carried over AAL2 to improve the resource utilization. To setup an AAL2 connection 510, the new AAL2 signaling protocol will be used. A connection request from a mobile terminal 512 received at a BS 514 initiates a AAL2 connection setup to the remote AAL2 peer entity located either in RAN 520 or Core Network (CN) 522. AAL2 connection setup involves negotiation of number of parameters such as, but not limited to, traffic and QoS, codec selection, and maximum size of AAL2 packet. When a mobile user 512 leave the S-RNC 530 and enters a D-RNC 532, the existing connection 510 at the S-RNC 530 has to be released and a new connection 540 has to be established at the D-RNC 532. Setting up new AAL2 connection 540 involves re-characterization of connection specific parameters and re-negotiation with the remote peer entity. This process will increase the handover delay and cause problem to the soft handover feature available in WCDMA based 3G networks.

AAL2 connections are originated from the BS 514 (or S-RNC 530) instead of a mobile terminal 512 in the 3G RAN. This separation of mobile call control and AAL2 connection control within the RAN adds complexity during the handover. Mobile terminals 512 do not have any information related to the AAL2 connection 510 within the RAN and cannot pass them to the new BS 560 or D-RNC 532. The lack of information about the existing AAL2 connection 510 at the D-RNC 532 during handover will force the D-RNC 532 to start the AAL2 connection setup all over again. This process will lead to re-negotiation of connection specific parameters with the peer entity and increase in delay during handover.

The present invention simplifies the AAL2 connection establishment at the D-RNC 532 during a handover. During a handover process, the existing AAL2 connection 510 originating entity (BS 514 or S-RNC 530) encapsulates the necessary information related to the AAL2 connection and transfer it to the new entity (BS 560 or D-RNC 532). The new BS 560 collects the information and uses them to setup the new AAL2 540 connection to the same remote peer entity. This process leads to a much faster connection setup since the new BS 560 need not to characterize the AAL2 connection specific parameters. In addition, renegotiation with the remote AAL2 peer entity is also avoided.

Figure 6:
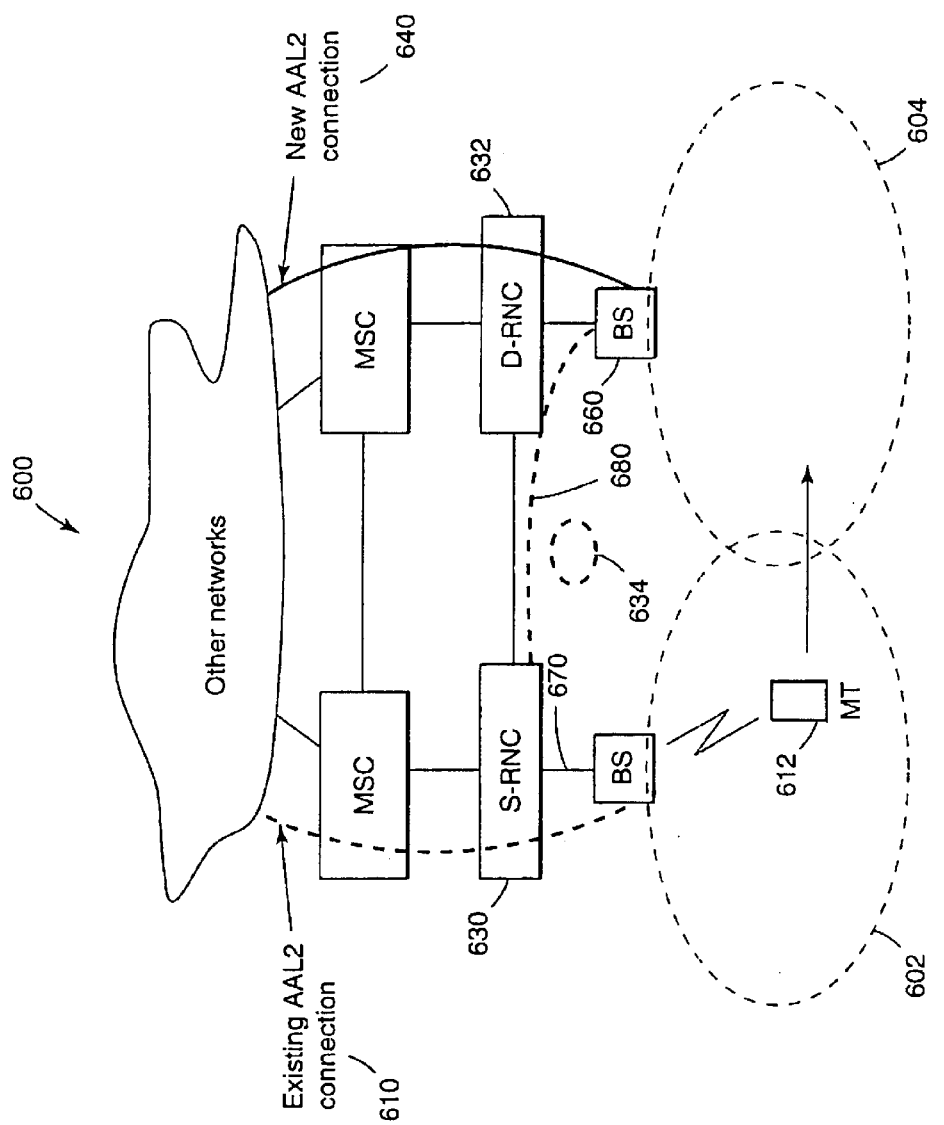
FIG. 6 illustrates the process of transferring the AAL2 connection information according to the present invention.

FIG. 6 illustrates the process of transferring the AAL2 connection information 600 according to the present invention. When a mobile user 612 travel from one BS coverage area 602 to another BS coverage area 604, the S-RNC 630 identifies the AAL2 connection 610 for that particular user 612. When the handover procedure is started, the S-RNC 630 bundles up all the AAL2 connection specific information and transfers the connection specific information 634 to the D-RNC 632 which is setting up the new AAL2 connection 640. Upon receiving the connection specific information 634, the D-RNC 632 uses the same information in setting up the new AAL2 connection 640. For example, traffic parameter values which existed in the previous connection 610 are used for the new AAL2 connection 640 such as, but not limited to, Peak Packet Rate (PPR), Burst Tolerance (BT) and QoS parameters.

The signaling 670 used between a BS and RNC is called Base Station Application Part (BSAP). Radio Network System Application Part (RNSAP) signaling 680 is used between the S-RNC 630 and the new BS 660 (via D-RNC 632) during a handover. The AAL2 connection specific information 634 is transferred within the RNSAP signaling protocol. When the handover process is initiated, the S-RNC 630 bundles up all the AAL2 connection specific parameters and encapsulate the connection specific parameters 634 in the RNSAP signaling protocol 680. The new BS 660 retrieves the information and uses it to setup the new AAL2 connection 640.

To implement the method, few changes are required in the BSAP and RNSAP signaling protocols. However, a new place holder is needed for the AAL2 connection specific information as well as transfer capability between BSAP and RNSAP. Once the new AAL2 connection 640 is established, the handover process can be completed by clearing the old connection.

Figure 7:
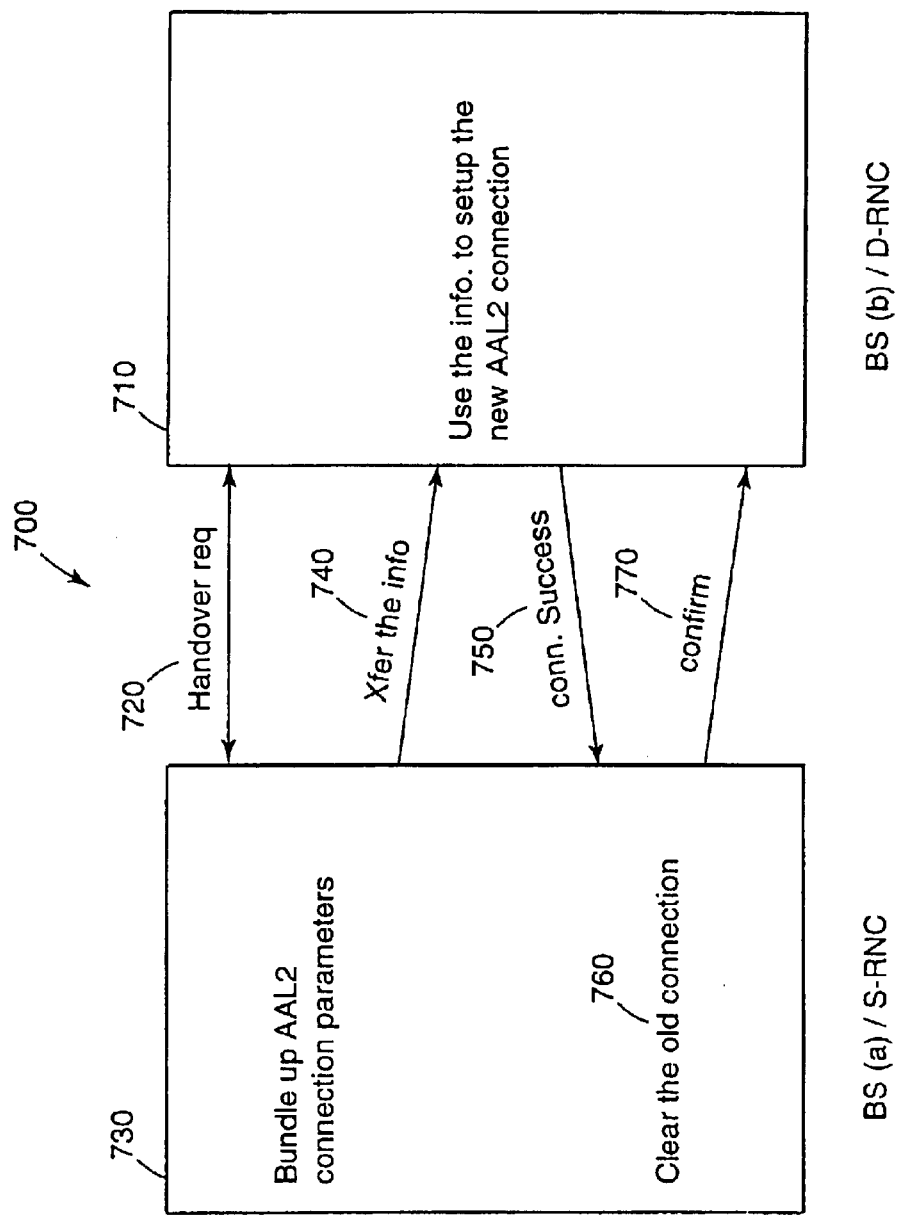
FIG. 7 illustrates a flow diagram for the method according to the present invention.

FIG. 7 illustrates a flow diagram 700 for the method according to the present invention. The new BS(b)/D-RNC 710 sends a handover request 720 to the old BS(a)/S-RNC 730. The old BS(a)/S-RNC 730 bundles the AAL2 connection parameters and transfers the bundled AAL2 connection parameters to the new BS(b)/D-RNC 740. The new BS(b)/D-RNC 710 sends a message 750 to the old BS(a)/S-RNC 730 indicating success of the handover. The old BS(a)/S-RNC 730 clears the connection 760 and sends a confirmation signal 770 to the new BS(b)/D-RNC. Accordingly, the present invention simplifies the AAL2 connection setup process at the D-RNC 710 during handover. Since the new BS(b)/D-RNC 710 uses the same connection specific parameters used by the old BS(a)(S-RNC 730), the connection setup is much faster and eliminates the renegotiation procedure with the remote peer entity.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for establishing a connection during a handover in a cellular access network, comprising:
   requesting a new connection from a destination access network to a remote peer by a mobile terminal;
   initiating a connection setup by the destination access network upon receiving a handover request from a serving access network;
   bundling connection parameters associated with an old connection by the serving access network;
   transferring the bundled connection parameters to the destination access network; and
   establishing a new connection to the remote peer connection by the destination access network using the transferred connection parameters.

2. The method of claim 1 wherein the bundled connection parameters is selected from the group comprising peak packet rate, burst tolerance, quality-of-service, codec selection, and maximum packet size.

3. The method of claim 1 wherein the transferring comprises encapsulating the connection parameters within the signaling messages used between the serving access network and the destination access network.

4. The method of claim 1 further comprising clearing the old connection.

5. The method of claim 1 further comprising:
   sending a connection success signal from the destination access network to the serving access network;
   clearing the old connection;

sending a confirm signal from the serving access network to the destination access network.

6. The method of claim 1 wherein the serving access network is a Base Station.

7. The method of claim 1 wherein the destination access network is a Base Station.

8. The method of claim 1 wherein the serving access network is a radio network controller.

9. The method of claim 1 wherein the destination access network is a radio network controller.

10. A radio access network, comprising:

an access network serving the a mobile terminal with a first connection from a Base Station to a remote peer entity;

a destination access network receiving a handover request from the serving access network;

wherein a connection setup is initiated by the destination access network upon receiving a handover request from a serving access network, and the serving access network bundling connection parameters associated with the existing connection by the serving access network and transferring the bundled connection parameters to the destination access network to establish a new connection to the remote peer connection by the destination access network using the transferred connection parameters.

11. The radio access network of claim 10 wherein the bundled connection parameters is selected from the group comprising peak packet rate, burst tolerance, quality-of-service, codec selection, and maximum packet size.

12. The radio access network of claim 10 wherein the connection parameters are encapsulated by the serving access network within signaling messages used between the serving access network and the destination access network.

13. The radio access network of claim 10 wherein the serving access network clears the first connection.

14. The radio access network of claim 10 wherein the destination access network sends a connection success signal from the destination access network to the serving access network and, in response to the connection success signal, the serving access network clears the first connection and sends a confirm signal to the destination access network.

15. The radio access network of claim 10 wherein the serving access network is a Base Station.

16. The radio access network of claim 10 wherein the destination access network is a Base Station.

17. The radio access network of claim 10 wherein the serving access network is a radio network controller.

18. The radio access network of claim 10 wherein the destination access network radio is a network controller.

* * * * *